(12) United States Patent
Magdych et al.

(10) Patent No.: US 8,266,703 B1
(45) Date of Patent: *Sep. 11, 2012

(54) SYSTEM, METHOD AND COMPUTER PROGRAM PRODUCT FOR IMPROVING COMPUTER NETWORK INTRUSION DETECTION BY RISK PRIORITIZATION

(75) Inventors: James S. Magdych, Chino, CA (US); Tarik Rahmanovic, Germantown, MD (US); John R. McDonald, Jacksonville, FL (US); Brock E. Tellier, Stamford, CT (US)

(73) Assignee: McAfee, Inc., Santa Clara, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 11/854,412

(22) Filed: Sep. 12, 2007

Related U.S. Application Data

(63) Continuation of application No. 10/011,165, filed on Nov. 30, 2001.

(51) Int. Cl.
*G06F 12/14* (2006.01)
(52) U.S. Cl. .......................................... 726/25
(58) Field of Classification Search ............... 726/25
See application file for complete search history.

(56) References Cited

U.S. PATENT DOCUMENTS

| | | | |
|---|---|---|---|
| 5,933,498 A | 8/1999 | Schneck et al. | 380/4 |
| 6,240,530 B1 | 5/2001 | Togawa | 714/38 |
| 6,298,445 B1 * | 10/2001 | Shostack et al. | 726/25 |
| 6,301,668 B1 * | 10/2001 | Gleichauf et al. | 726/25 |
| 6,343,362 B1 * | 1/2002 | Ptacek et al. | 726/23 |
| 6,574,737 B1 | 6/2003 | Kingsford et al. | 713/201 |
| 6,711,127 B1 | 3/2004 | Gorman et al. | 370/230 |

FOREIGN PATENT DOCUMENTS

WO 01/38999 5/2001

OTHER PUBLICATIONS

U.S. Appl. No. 10/006,550, filed Nov. 30, 2001.
Final Office Action for U.S. Appl. No. 10/011,165 mailed Aug. 17, 2005.
Non-Final Office Action for U.S. Appl. No. 10/011,165 mailed Apr. 28, 2005.

* cited by examiner

*Primary Examiner* — Jacob Lipman
(74) *Attorney, Agent, or Firm* — Wong Cabello Lutsch Rutherford & Bruccileri LLP

(57) ABSTRACT

A system, method and computer program product are provided for prioritized network security. Initially, a risk assessment scan is conducted for identifying vulnerabilities on a network device. Next, network communications are identified that exploit the vulnerabilities identified by the risk assessment scan before identifying network communications that exploit other vulnerabilities. In other words, network communications are monitored for identifying any exploitation of the vulnerabilities identified by the risk assessment scan before identifying any exploitation of other vulnerabilities.

15 Claims, 6 Drawing Sheets

SYSTEM, METHOD AND COMPUTER PROGRAM PRODUCT FOR IMPROVING COMPUTER NETWORK INTRUSION DETECTION BY RISK PRIORITIZATION

RELATED APPLICATION(S)

The present application is a continuation of application Ser. No. 10/011,165 filed on Nov. 30, 2001, which is incorporated herein by reference.

FIELD OF THE INVENTION

The present invention relates to intrusion detection scanning methods, and more particularly to improving intrusion detection scanning performance.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capacities in order to cause denial of service, and so forth.

A variety of intrusion detection programs have been developed to detect and protect against threats to network security. As is known in the art, a common method of detecting these threats is to use a scanning engine to scan for known attacks against networked computers. These attacks can be identified by their unique "attack signature" which generally consists of a string of binary or text data. Upon the detection of an attack signature by the scanning engine, protective measures can be taken, including: sending alerts, intercepting harmful traffic, or disconnecting users who launch attacks.

Such intrusion detection programs are often positioned on a network to monitor traffic between a plurality of network devices. Unfortunately, the amount of traffic on networks such as the Internet is constantly growing. In conjunction with such growth, there is a steady growth of attack signatures that must be compared against the network traffic.

Due to these phenomena, an intrusion detection program is often overloaded and can not "keep up" with scanning all of the traffic. One result of such overload is the dropping of packets and connections by the intrusion detection program. This, in turn, results in the increased possibility that an attack will go unnoticed.

DISCLOSURE OF THE INVENTION

A system, method and computer program product are provided for prioritized network security. Initially, a risk assessment scan is conducted for identifying vulnerabilities on a network device. Next, network communications are identified that exploit the vulnerabilities identified by the risk assessment scan before identifying network communications that exploit other vulnerabilities. In other words, network communications are monitored for identifying any exploitation of the vulnerabilities identified by the risk assessment scan before identifying any exploitation of other vulnerabilities.

By this design, the vulnerabilities of a higher risk may be tested before vulnerabilities of a lower risk. This way, the present embodiment increases the chances of identifying an intrusion or attack in an environment where the network communications are sometimes dropped during scanning due to an overload condition.

In one embodiment, general information about target systems (such as services running, e.g. Web services, e-mail services, etc) may be used to prioritize vulnerabilities, even in the absence of specific vulnerability information. In other words, a web server that is not specifically found to be vulnerable to any known threats could still result in a heightened awareness by the intrusion detection software of any web server-related attacks.

In another embodiment, the risk assessment scan may be carried out utilizing a risk assessment scanning tool. Further, the identification of network communications that exploit the vulnerabilities may be carried out by an intrusion detection tool. Of course, the foregoing functionality may optionally be carried out by the same module.

In still another embodiment, the risk assessment scan may be repeated periodically. Moreover, the risk assessment scan may be performed on a plurality of network devices.

In still yet another embodiment, the vulnerabilities identified by the risk assessment scan may be prioritized. As such, the network communications that exploit the prioritized vulnerabilities identified by the risk assessment scan may be identified before identifying network communications that exploit other vulnerabilities. As an option, the vulnerabilities may be prioritized by comparing the vulnerabilities identified by the risk assessment scan against a plurality of groups of vulnerabilities. Moreover, the groups of vulnerabilities may include a low risk group, a medium risk group, and a high risk group.

Optionally, the vulnerabilities identified by the risk assessment scan may be transmitted to an intrusion detection system capable of identifying the network communications that exploit the vulnerabilities identified by the risk assessment scan before identifying network communications that exploit other vulnerabilities. Again, the foregoing may optionally be carried out by the same module, as set forth hereinabove.

In use, a remedying event may be executed upon identifying network communications that exploit the vulnerabilities.

DESCRIPTION OF THE PREFERRED EMBODIMENTS

Figure 1:
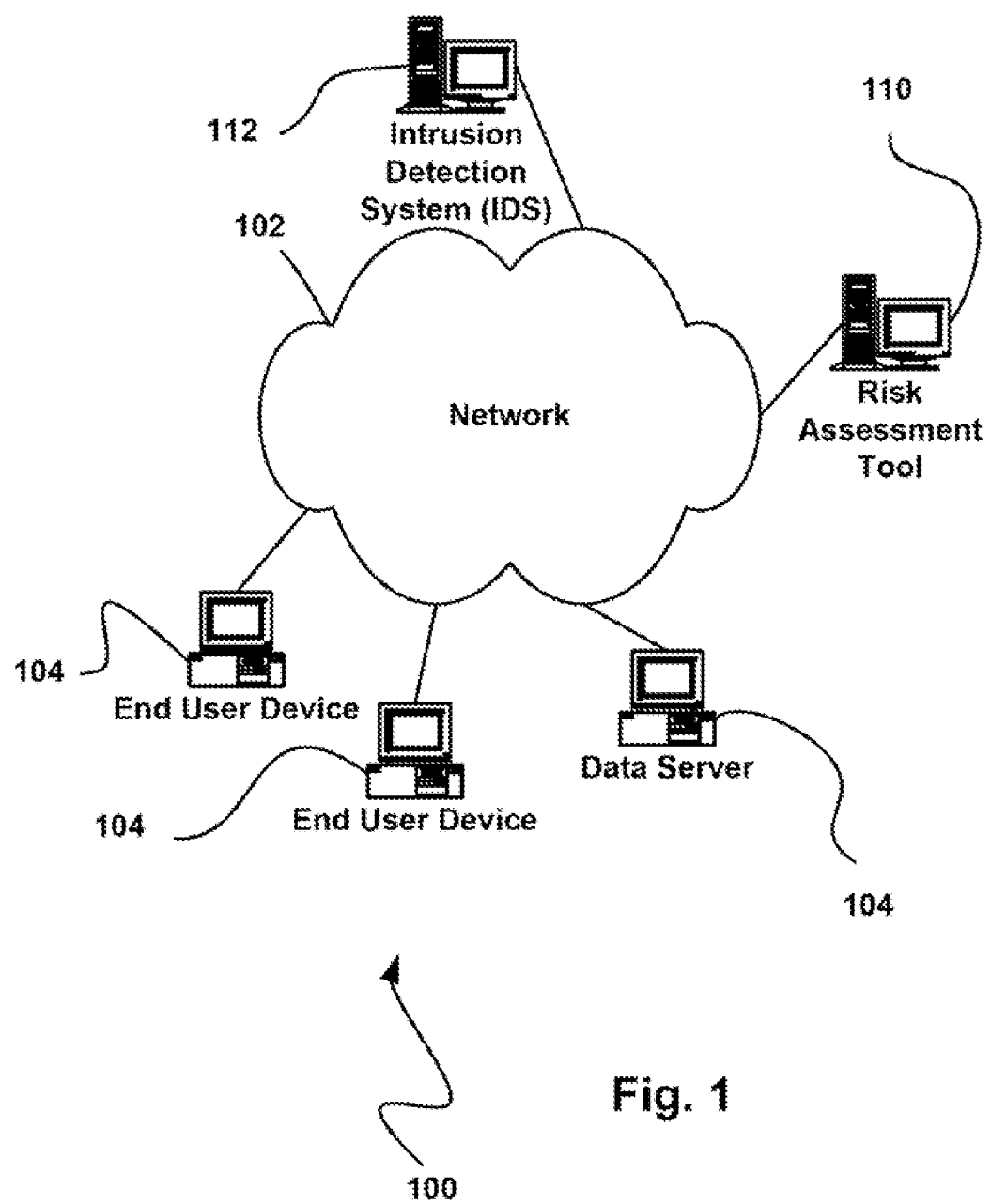
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a local area network (LAN), a wide area network (WAN) such as the Internet, etc.

Coupled to the network 102 are data servers and end user computers 104 which are capable of communicating over the network 102. In the context of the present description, such data servers and end user computers 104 may include a web server, desktop computer, lap-top computer, hand-held computer, printer or any other type of hardware/software network device. More detail regarding an exemplary embodiment of such data servers and end user computers 104 will be set forth hereinafter during reference to FIG. 2.

Also included is a risk assessment scanning tool 110. In use, the risk assessment scanning tool 110 may be used to simulate an attack against one of the foregoing network devices via a remote or local connection. Such risk assessment scanning tool 110 can probe for network weaknesses b simulating certain types of security events that make up an attack. Such risk assessment scanning tool 110 may also test user passwords for suitability and security. Of course, the risk assessment scanning tool 110 may be used to identify any type of vulnerabilities of a system. More detail regarding an exemplary risk assessment scanning tool 110 will be set forth hereinafter during reference to FIG. 3.

The network architecture 100 further includes an intrusion detection tool 112. The intrusion detection tool 112 detects attacks or intrusions by scanning network communications between the various foregoing network devices. Of course, the intrusion detection tool 112 may also be capable of scanning executable files, application macro files, disk boot sectors, etc. This scanning may include comparing the network communications, etc. with a plurality of virus or other attack signatures that may be constantly updated. Upon the detection of a signature by the intrusion detection tool 112, a remedying event may then be used to report the problem, quarantine the infected communications, and/or extract the harmful information from the infected communications, thereby disinfecting the communications.

Of course, the intrusion detection tool 112 may be used to detect any type of intrusion or attack on a system. More detail regarding an exemplary intrusion detection tool 112 will be set forth hereinafter during reference to FIGS. 5 and 6.

In one embodiment, the risk assessment scanning tool 110 may reside at a predetermined computer or server. Further, the intrusion detection tool 112 may reside on a gateway. As an option, the risk assessment scanning tool 110 and the intrusion detection tool 112 may reside on a similar network device, or even be integrally combined in a single module.

In use, a risk assessment scan may be conducted by the risk assessment scanning tool 110 for identifying vulnerabilities on a network device. Next, the intrusion detection tool 112 works to identify network communications that exploit the vulnerabilities identified by the risk assessment scan before identifying network communications that exploit other vulnerabilities. In other words, network communications are monitored for identifying any exploitation of the vulnerabilities identified by the risk assessment scan before identifying any exploitation of other vulnerabilities. More information on an exemplary application of such technique will be set forth hereinafter in greater detail.

By this design, the vulnerabilities of a higher risk may be tested before vulnerabilities of a lower risk. This way, the present embodiment increases the chances of identifying an intrusion or attack in an environment where the network communications are sometimes dropped during scanning due to an overload condition.

Figure 2:
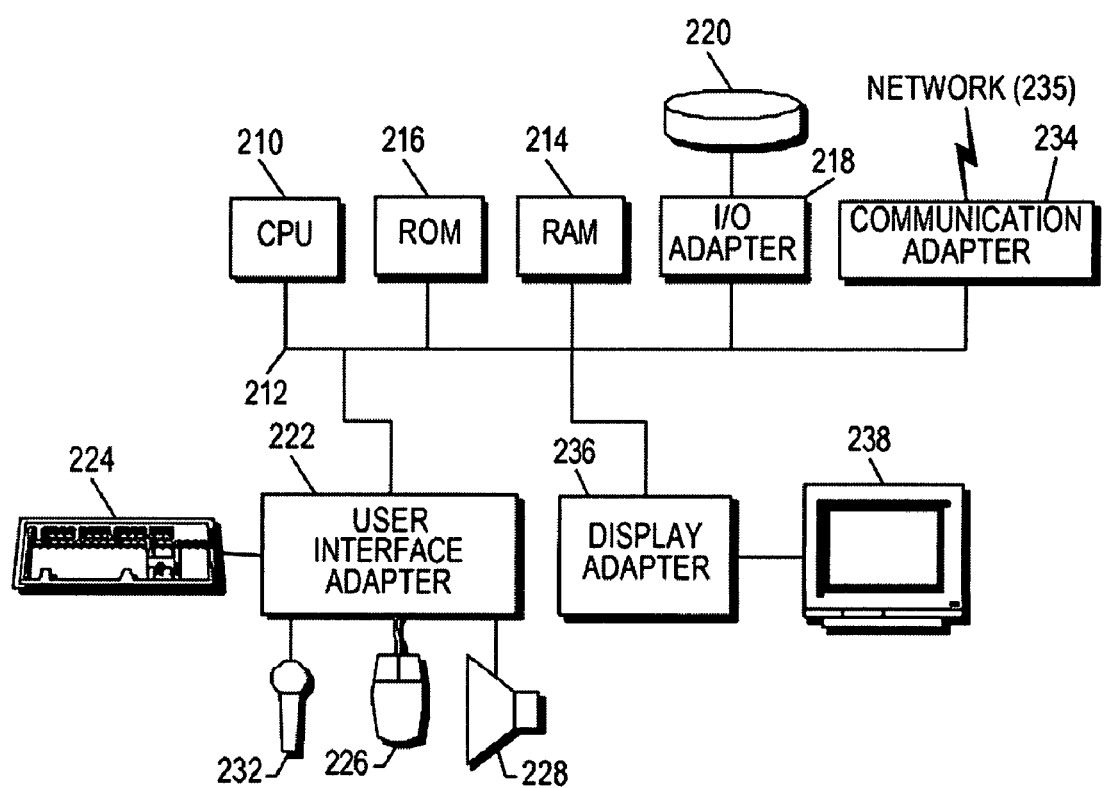
FIG. 2 shows a representative hardware environment that may be associated with the data servers and/or end user computers of FIG. 1, in accordance with one embodiment.

FIG. 2 shows a representative hardware environment that may be associated with the data servers and/or end user computers 104 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
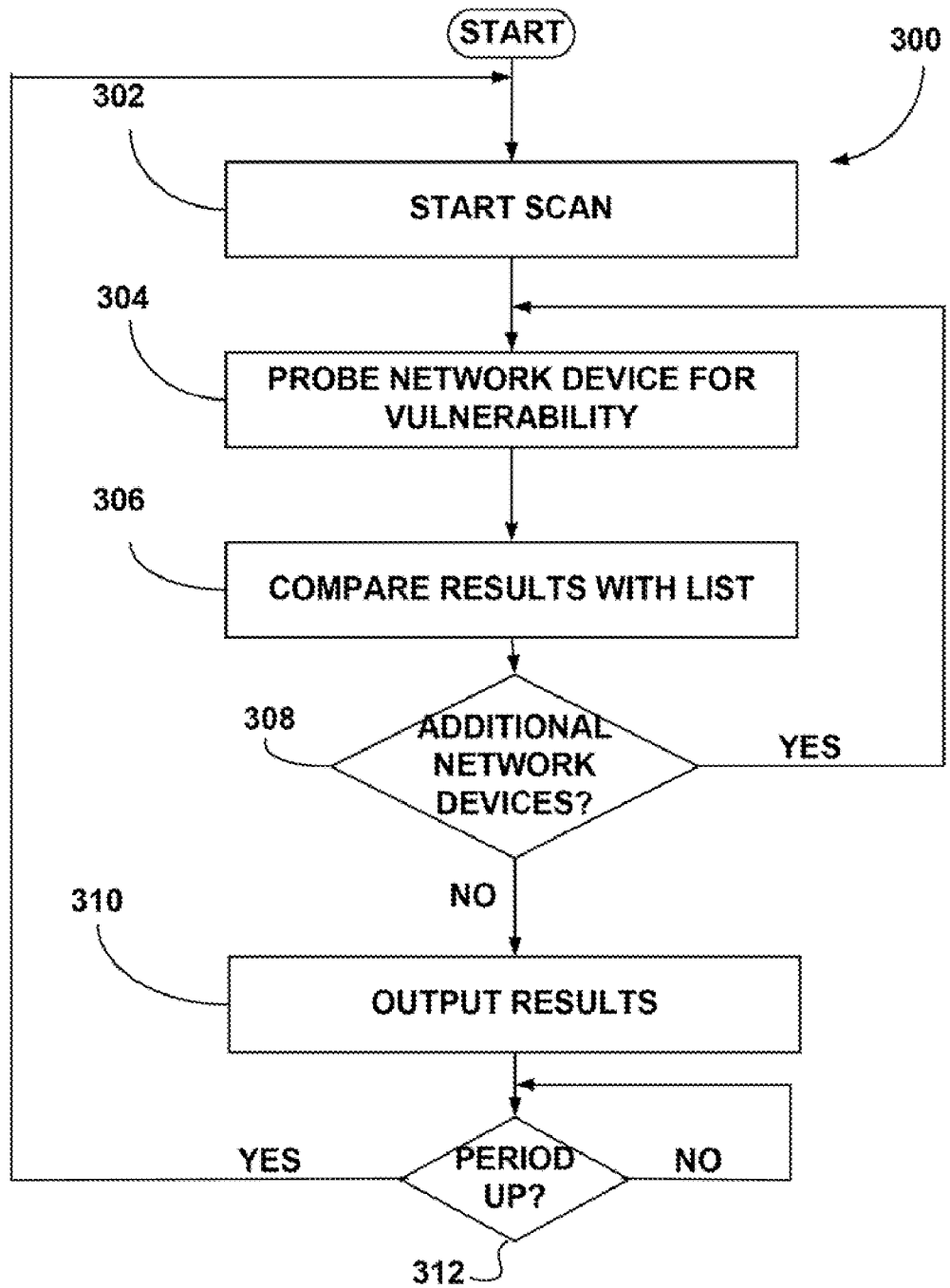
FIG. 3 illustrates a method for a risk assessment scan, in accordance with one embodiment.

FIG. 3 illustrates a method 300 for a risk assessment scan, in accordance with one embodiment. As an option, the present method 300 may be carried out in the context of the risk assessment scanning tool 110 of the network architecture 100 of FIG. 1. Of course, however, the present method 300 may be executed in any desired context and environment.

Initially, a scan is first started in operation 302. This initiation may be prompted in any desired manner that begins the present method 300. Next, a first network device is identified and probed for a vulnerability in operation 304. For example, in operation 304, network weaknesses may be probed by simulating certain types of security events that make up an attack.

Table 1 sets forth more information on an exemplary set of vulnerability probes. It is important to note that this set of vulnerability probes is merely illustrative in nature and should not be construed as limiting in any manner.

TABLE 1

STAT (file)

Arguments:
file - name of the file to stat
Function:
This vulnerability probe takes a file and performs a
stat system call and returns a result.

TABLE 1-continued

READ (file, start, end)

Arguments:
file - name of the file to read
start - starting position in file
end - ending position in file
Function:
This vulnerability probe opens and reads a file, with
optional starting and ending parameters. This allows
the administrator to read/dev/kmem/parse.
READDIR (dir)

Arguments:
dir - directory to read
Function:
This vulnerability probe uses getdents ( ) or readdir ( )
to return the contents of a directory.
FIND (start, function, arg)

Arguments:
start - place in fs tree to start find
function - function to use when finding files including
the following:
    name - find files named arg
    perm - arg specifies permission mask for
    finding files
    arg - see function
Function:
This vulnerability probe returns a list of files that
are matched by the specified function. Since FIND is an
expensive operation, multiple filters may be set, and a
RUNFIND command may be executed which returns the
result. This way, the entire tree is only recursed once.
GETPWENT Function:
This vulnerability probe retrieves an entry from the
password database. Each call gets the next entry.
GETGRENT Function:
This vulnerability probe retrieves an entry from the
group database. Each call gets the next entry.
CHKSUM (file)

Arguments:
file - name of the file to checksum
Function:
This vulnerability probe performs a checksum/hash of a
file. It may be used for checking against a list of
known hashes for OS distributions for sensitive binaries
and libs.
EXEC (file, args)

Arguments:
file - name of file to execute
args - initial arguments
Function:
This vulnerability probe is used to execute an arbitrary
command on the system. If a child was terminated by a
signal, this information should be returned. This
vulnerability probe may be used for testing particular
files for buffer overflows, and could also be used for
running ndd and sysctl in order to determine kernel
parameters.

In the context of the present description, a vulnerability may include any characteristic that may make a network device more susceptible to an intrusion or attack.

Results generated by this probing of operation 304 may then be compared against a list of known vulnerabilities in operation 306. By this design, any known vulnerabilities are identified by the present method 300. The foregoing operations 304 and 306 are then repeated for any available network device, as indicated by decision 308.

Once complete, the results are outputted in operation 310. More information regarding such results will be set forth during reference to FIG. 4. Next, the present method 300 polls until a certain period elapses after which the method 300 is repeated. Note decision 312. By this design, the present method 300 ensures that all newly appearing network vulnerabilities are identified as time and network usage progresses.

Figure 4:
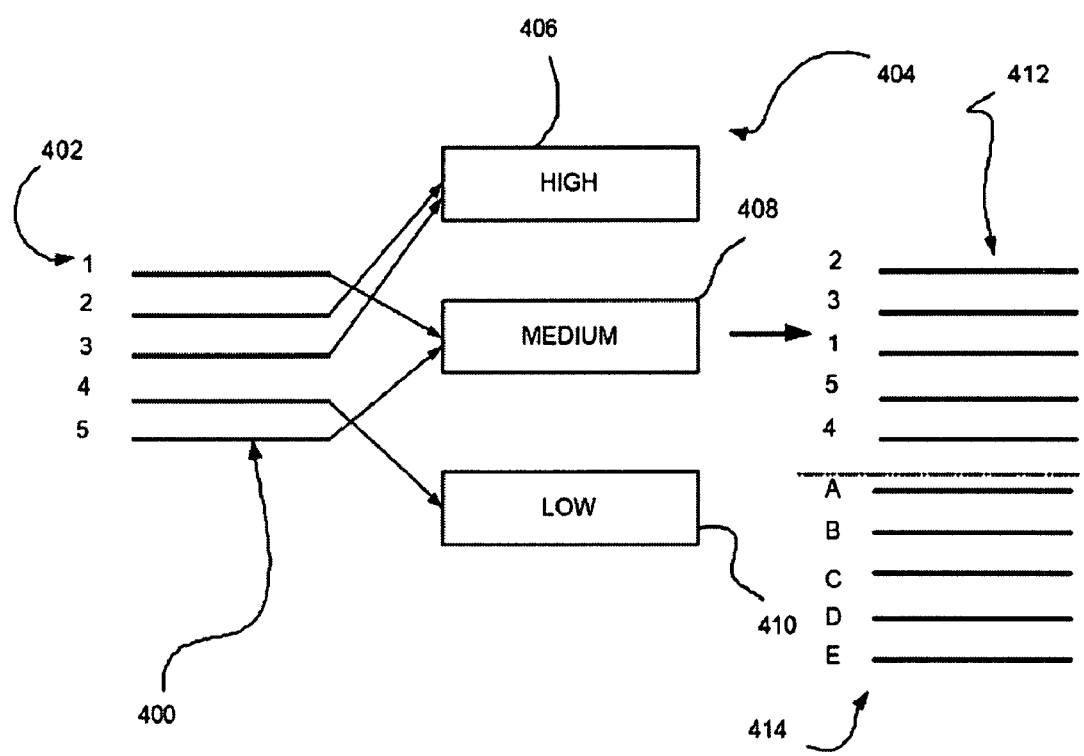
FIG. 4 shows the results of the risk assessment scan of FIG. 3 in addition to an optional prioritization thereof.

FIG. 4 shows the results 400 of the risk assessment scan of FIG. 3 in addition to an optional prioritization thereof. As shown, the results include a plurality of known vulnerabilities 402 that appear to exist in one or more of the network devices, as indicated by the method 300 of FIG. 3.

As an option, the vulnerabilities may be prioritized by comparing the vulnerabilities 402 identified by the risk assessment scan against a plurality of groups 404 of vulnerabilities. Optionally, the groups 404 of vulnerabilities may include a low risk group 410, a medium risk group 408, and a high risk group 406.

Once any of the vulnerabilities 402 are successfully compared with one of the groups 404, the vulnerabilities 402 may be reordered such that the vulnerabilities 402 that reside in the high risk group 406 are listed before the vulnerabilities 402 that reside in the low risk group 410 and medium risk group 408, and the vulnerabilities 402 that reside in the medium risk group 408 are listed before the vulnerabilities 402 that reside in the low risk group 410.

As an option, any additional known vulnerabilities 414 may be added below the reordered list of vulnerabilities 412. As will soon become apparent, this may be important to ensure that all vulnerabilities are tested in addition to those detected by the risk assessment scan of FIG. 3.

Of course, the prioritization may be accomplished in any desired fashion, or not at all. Just by way of example, a formula or weighting system may be used, or any other technique that results in a reordered list of vulnerabilities 412. With the results of the risk assessment scan now available, such may be used in any desired fashion for enhancing network security. For example, they may be used in the context of an intrusion detection scheme.

In one embodiment, general information about target systems (such as services running, e.g. Web services, e-mail services, etc) may be used to prioritize the vulnerabilities, even in the absence of specific vulnerability information. In other words, a web server that is not specifically found to be vulnerable to any known threats could still result in a heightened awareness by the intrusion detection software of any web server-related attacks.

Figure 5:
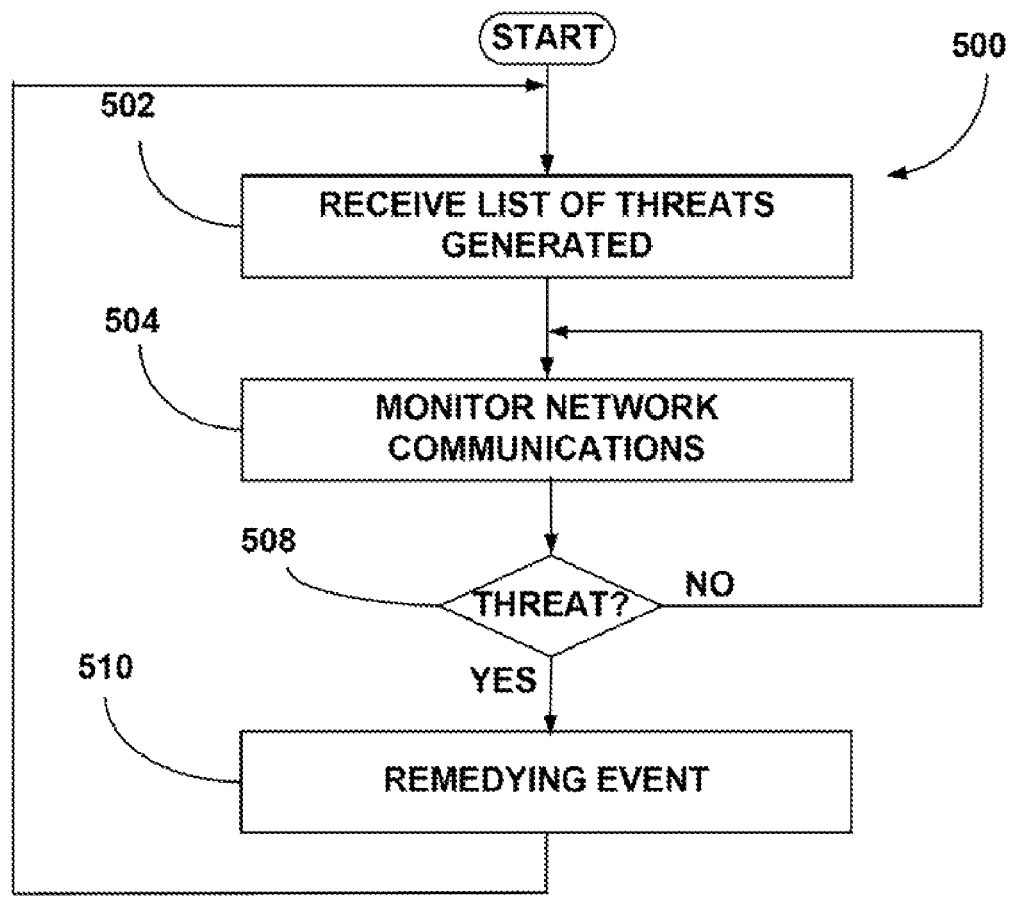
FIG. 5 is a flowchart of a method for detecting intrusions to a network, in accordance with one embodiment.

FIG. 5 is a flowchart of a method 500 for detecting intrusions to a network, in accordance with one embodiment. As an option, the present method 500 may be carried out in the context of the intrusion detection tool 112 of the network architecture 100 of FIG. 1. Of course, however, the present method 500 may be executed in any desired context and environment.

As shown, the list of vulnerabilities is first received in operation 502. In one embodiment where the risk assessment scanning tool 110 and the intrusion detection tool 112 are separate network devices, the receipt of the list of vulnerabilities may occur using any desired transmission protocol (i.e. TCP/IP and/or IPX).

In operation 504, network communications are monitored. In one embodiment, the network communications are monitored packet-by-packet. It is then determined whether the currently monitored network communications represent a threat in that they exploit a known vulnerability in decision 508. In other words, it is determined whether the network communications utilize the vulnerability in any way. More information on the manner in which threats are detected will be set forth in greater detail during reference to FIG. 6.

If it is found that the network communications exploit a known vulnerability in decision 508, a remedying event is executed. Note operation 510. This remedying event may involve reporting the problem, quarantining the infected communications, and/or extracting the harmful information from the infected communications, thereby disinfecting the communications.

Figure 6:
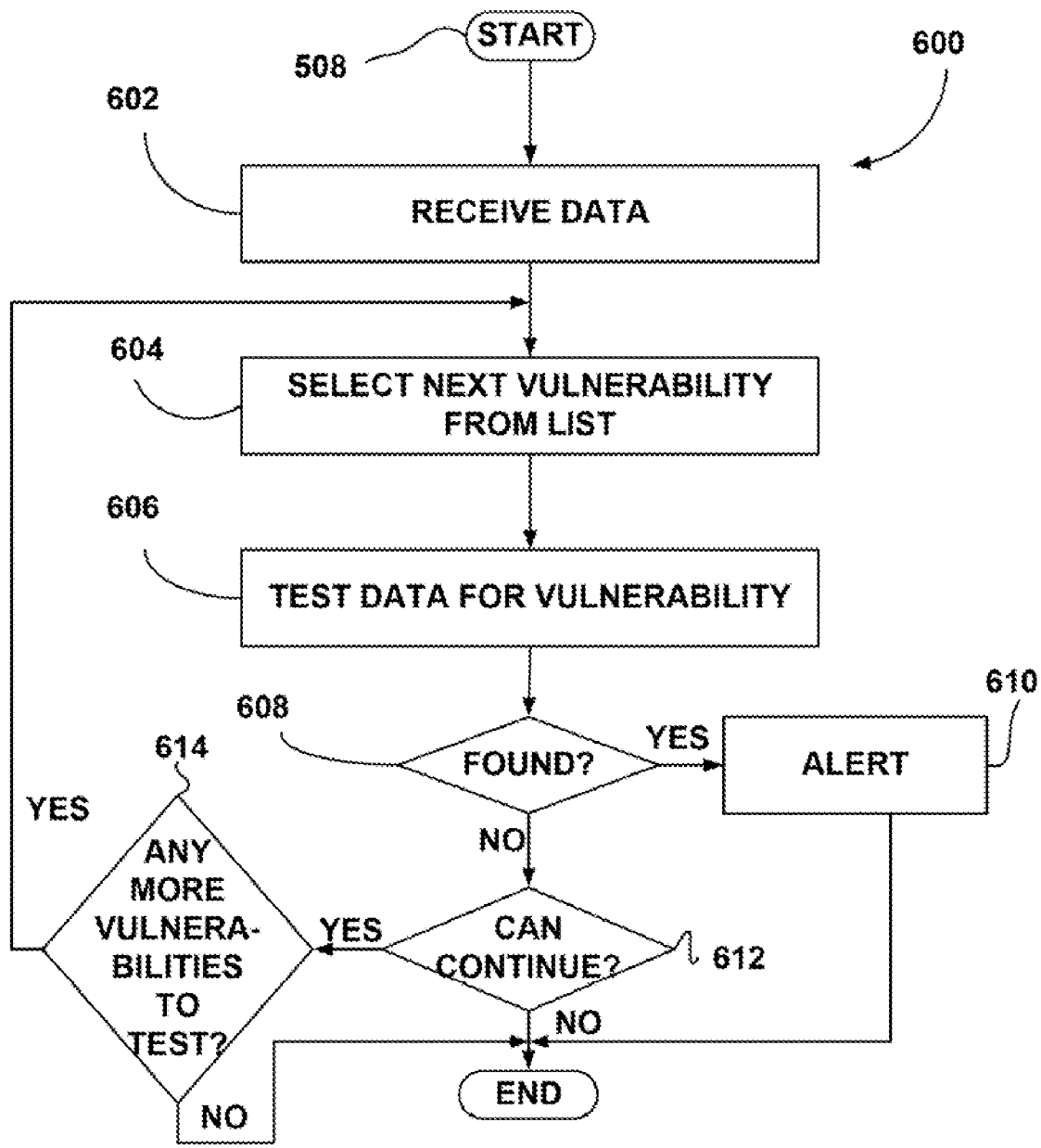
FIG. 6 illustrates a method by which it is determined that network communications exploit a known vulnerability per decision 508 of FIG. 5.

FIG. 6 illustrates a method 600 by which it is determined that network communications exploit a known vulnerability per decision 508 of FIG. 5. Initially, data associated with the network communications is received in operation 602. Again, this data may take the form of a packet, or any other component of network communications.

Next, a first vulnerability is selected from the list received in operation 502 of FIG. 5. Also note 412 and 414 in FIG. 4. A test is then conducted to determine whether the current vulnerability is found. See operation 606. This may be a simply comparison operation involving a signature, or any other desired known technique. If, in decision 608, the packet is determined to exploit the current vulnerability, this is reported in operation 610 so that appropriate action may be taken in decision 508 of FIG. 5.

If, however, the packet is determined not to exploit the current vulnerability in decision 608, it is first determined whether the testing can continue in operation 612. This decision may be based on various factors including, but not limited to bandwidth limitations, overloading conditions, etc. If it is determined in decision 612 that the testing can continue, it is then determined in decision 614 whether any additional vulnerabilities are left to be tested. If not, the current method 600 is terminated and the process continues after decision 508 of FIG. 5.

If however, it is determined in decision 614 that additional vulnerabilities are left to be tested, the method 600 continues at operation 604 to select an additional vulnerability, and so on.

As such, the vulnerabilities of a higher risk may be tested before vulnerabilities of a lower risk. This way, the present embodiment increases the chances of identifying an intrusion or attack in an environment where the network communications are sometimes dropped during scanning due to an overload condition.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for prioritized network security, comprising:
performing a risk assessment scan for identifying vulnerabilities on a network device;
prioritizing the vulnerabilities identified by the risk assessment scan and known vulnerabilities not identified by the risk assessment scan to form a prioritized order, wherein at least one identified vulnerability is prioritized higher than a non-identified vulnerability; and
inspecting network communications to attempt to identify, in priority order, network communications that exploit the at least one identified vulnerability before attempting to identify network communications that exploit other known vulnerabilities not identified by the risk assessment scan;
wherein performing the risk assessment scan includes simulating security events.

2. The method as recited in claim 1, wherein the risk assessment scan is carried out utilizing a risk assessment scanning tool.

3. The method as recited in claim 1, wherein the risk assessment scan is performed on a plurality of network devices.

4. The method as recited in claim 1, further comprising executing a remedying event upon identifying network communications that exploit the vulnerabilities.

5. The method as recited in claim 1, wherein the network communications that exploit vulnerabilities of a lower risk are dropped before network communications that exploit vulnerabilities of a higher risk.

6. The method as recited in claim 1, wherein the network communications include packets.

7. The method as recited in claim 1, wherein results of simulating the security events and executing the one or more vulnerability probes are compared against a list of known vulnerabilities.

8. The method as recited in claim 1, wherein the risk assessment scan is repeated.

9. The method as recited in claim 8, wherein the risk assessment scan is repeated periodically.

10. The method as recited in claim 1, wherein the vulnerabilities are prioritized by comparing the vulnerabilities identified by the risk assessment scan against a plurality of groups of vulnerabilities.

11. The method as recited in claim 10, wherein the groups of vulnerabilities include a low risk group, a medium risk group, and a high risk group.

12. The method as recited in claim 11, wherein the vulnerabilities identified by the risk assessment scan are transmitted to an intrusion detection system capable of identifying the network communications that exploit the vulnerabilities identified by the risk assessment scan before identifying network communications that exploit other vulnerabilities.

13. The method as recited in claim 11, wherein the act of performing the risk assessment scan and the act of identifying the network communications are carried out by a common module.

14. A computer program product for prioritized network security embodied on a non-transitory computer-readable medium comprising instructions to cause one or more processing devices to:
perform a risk assessment scan to identify vulnerabilities on a network device;
prioritize the vulnerabilities identified by the risk assessment scan and known vulnerabilities not identified by the risk assessment scan to form a prioritized order, wherein at least one identified vulnerability is prioritized higher than a non-identified vulnerability; and
inspect network communications to attempt to identify, in priority order, network communications that exploit the at least one identified vulnerability before attempting to identify network communications that exploit other known vulnerabilities not identified by the scan;
wherein the instructions to cause the one or more processors to perform the risk assessment scan further comprise instructions to cause the one or more processors to simulate security events that make up an attack and instructions to cause the one or more processors to execute one or more vulnerability probes.

15. A method for prioritized network security, comprising:
- performing a risk assessment scan for identifying vulnerabilities on a plurality of network devices utilizing a risk assessment scanning tool;
- prioritizing the vulnerabilities identified by the risk assessment scan and known vulnerabilities not identified by the risk assessment scan to form a prioritized order, wherein at least one identified vulnerability is prioritized higher than a non-identified vulnerability; and
- utilizing the prioritized vulnerabilities to enhance network security;
- wherein performing the risk assessment scan includes simulating security events that make up an attack and executing one or more vulnerability probes; and
- wherein network communications that exploit the prioritized vulnerabilities identified by the risk assessment scan are attempted to be identified before attempting to identify network communications that exploit other known vulnerabilities not identified by the scan.

* * * * *